May 26, 1959

H. S. TOCZYLOWSKI 2,887,774

APPARATUS FOR ADJUSTING THE RETICULE OF
A RANGE-FINDING MECHANISM

Filed Nov. 3, 1954

Inventor
H. S. TOCZYLOWSKI
By Fetherstonhaugh & Co.
Attorneys

United States Patent Office 2,887,774
Patented May 26, 1959

2,887,774

APPARATUS FOR ADJUSTING THE RETICULE OF A RANGE-FINDING MECHANISM

Henryk Stanislaw Toczylowski, Montreal, Quebec, Canada, assignor to Beaconing, Optical and Precision Materials Co. Ltd., Montreal, Quebec, Canada Application November 3, 1954, Serial No. 466,604

3 Claims. (Cl. 33—46)

This invention relates to an apparatus of allowing for the changes in the ballistic curve of optical aiming instruments known as range-finder sights.

The common feature of all these instruments is that they combine two distinct functions: one is the range-finding, i.e., the determining of the distance to the target; the other is sighting, i.e., providing for a suitable tangent elevation of the barrel of the weapon to which the instrument is clamped.

In range-finder sights to which the invention applies the range is determined by an adjustable optical system which operates on the total coincidence or split-image principle and the required tangent elevation is provided by a haircross which is moved vertically across the field of vision.

The motions of the adjustable optical system and of the haircross are correlated by means of a suitable mechanical link (i.e., by a cam-driven lever) which is designed to operate in a manner determined by the ballistic curve of the weapon.

An example of a range-finder sight of this type is illustrated in abandoned application Serial No. 314,029, filed October 10, 1952 in the name of T. Malinowski, and entitled Combined Range Finder and Sight, in which two relatively rotatable wedges are arranged intermediate a pair of fixed reflecting prisms to bring the images reflected by the prisms into coincidence along the optical axis of the instrument. Rotation of one of said wedges operates a cam to apply force to a lever rotatable about a fixed fulcrum or pivot. The lever, in turn, effects vertical adjustment of a reticule located along the optical axis of the instrument. The cam and lever are designed to operate in a manner suited to a predetermined ballistic requirement to effect vertical adjustment of the reticule according to the range of the target.

In practice the actual ballistic curve might depart in a determined and predictable manner from that which was taken as a basis for designing the instrument. This might happen for any number of reasons, such as a change in the type of ammunition, alteration of muzzle velocity due to thermal or other changes in the propellant, difference in levels of the target relative to the weapon, variations in air pressure or air velocity, etc.

If this happens the instrument no longer works properly until the mechanical link between the range-finding and the sighting systems is replaced by another link designed to suit the new ballistic curve.

I have found that this disadvantage may be overcome by providing the mechanical link with a feature whose effect amounts to a change of the scale of ordinates of the original ballistic curve of the instrument, $e_1 = f(R)$, so that the new ballistic curve for which the instrument now caters is given by the equation $e_1^1 = k.f(R)$ where $e_1$ and $e_1^1$ are tangent elevations, R is the range and $k$ is an adjustable constant. In fact I have found that by a suitable choice of the constant $k$ the new ballistic curve ($e_1^1$) can be made to approximate to a great accuracy most of the actual ballistic curves encountered in practice.

According to the invention the method of altering the scale of ordinates of the ballistic curve in the manner described is by changing the transfer ratio (T) of the linking mechanism, where T is defined by the formula:

$$T = \frac{d_2}{d_1}$$

in which $d_1$ is the displacement of the optical mechanism and $d_2$ is the corresponding displacement of the haircross. In order to achieve the desired change of the ballistic curve for which the instrument caters, the new transfer ratio ($T^1$) must satisfy the equation:

$$\frac{T^1}{T} = \frac{e_1^1}{e_1} = k$$

In drawings which illustrate the principle of the invention and its embodiments;

Figure 1:
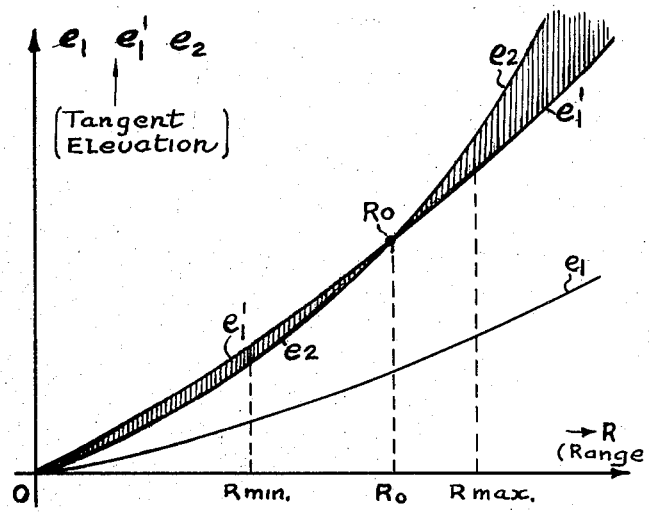
Figure 1 is a graph showing the principle of the invention.

With reference to Figure 1, $e_1$ is the tangent elevation for which the range-finder sight is designed, $e_2$ is the desired tangent elevation required in the modified conditions and $e_1^1$ is one of the tangent elevations for which the instrument can cater if fitted with a linking mechanism having an adjustable transfer ratio which is the object of the present invention.

It is seen that the fitting of the curve $e_1^1$ to the desired curve $e_2$ is achieved on the two-point tracking principle, one of the tracking points for no error is at $R=0$ and the other at $R=R_0$. The latter point can be chosen arbitrarily in such a manner as to minimize the residual errors within the operational range of the instrument between the limits R min. and R max. The residual errors are shown by a shaded area on the graph.

Figure 2:
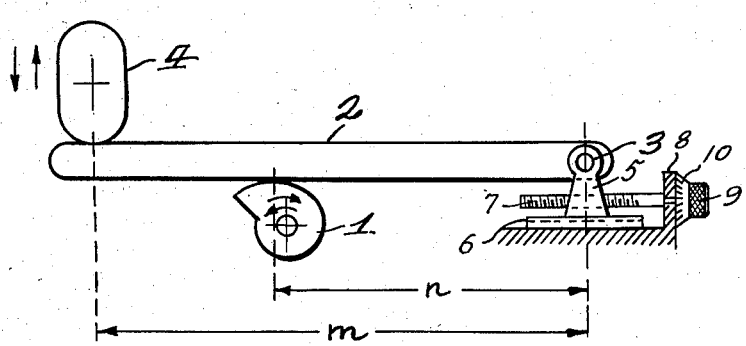
Figure 2 is a diagrammatic drawing of the invention applied to a range-finder sight with a linking mechanism of the cam-and-lever type.

With reference to Figure 2, 1 is a cam driven by the range-finding mechanism of an optical system such as is shown in the above mentioned co-pending application Serial No. 314,029, that is to say, through rotation of one of its relatively rotatable image deviating wedges; 2 is a lever operated by the cam 1, whose free end activates a reticule 4 with a haircross to effect vertical adjustment of same and the other end is supported by a pivot 3. In this case the transfer ratio (T) is determined by the ratio of the arm lengths ($m$ and $n$) of the lever:

$$T = \frac{m}{n}$$

and the desired modification of the ballistic curve can be approximated by suitably altering this ratio, i.e., by a lateral shift of the pivot 3. The pivot-shifting mechanism can be of any conventional design and its drive can be labelled directly in terms of the factor which causes a change in the ballistic curve, such as propellant temperature, elevation of the target, etc. For example, the pivot support 5 may be slidable along a fixed track 6 and may be internally threaded to accommodate a screw 7 which is secured against movement along its axis to a bracket 8. A knob 9 rotates screw 7 which, in turn, moves the supports along track 6 to thereby effect lateral shift of pivot 3 and alter the ratio of the arm lengths $m$ and $n$. A dial 10 coupled to knob 9 can be calibrated directly in terms of the factor which causes the changes in the ballistic curve of the weapon to thereby determine the required alteration of the ratio of the arm lengths $m$ and $n$.

The embodiments of the invention in which an exclusive property or privilege is claimed are defined as follows:

1. In a range-finding and sight adjusting mechanism of the type comprising an optical range-finding system, which operates on the total coincidence or split-image principle, and which includes a member which is manually operable to adjust the optical system to determine the distance to the target, a sighting system including a sighting reticule mounted for vertical adjustment, a pivotally mounted reticule adjusting lever operatively engaging said reticule at a point of contact spaced from the pivotal axis of the lever, a cam connected to and rotatable in response to movements of said manually operable member, said cam engaging said lever at a point spaced from both the pivotal axis of the lever and the point of contact between the lever and the reticule and means for varying the ratio of the length of lever arm between the pivotal axis and the point of contact of the lever with the cam and the length of the lever arm between said pivotal axis and the point of contact of the lever with the sighting reticule.

2. In a range-finding and sight adjusting mechanism of the type comprising an optical range-finding system, which operates on the total coincidence or split-image principle, and which includes a member which is manually operable to adjust the optical system to determine the distance to the target, a sighting system including a sighting reticule mounted for vertical adjustment, a reticule adjusting lever mounted to swing about a pivotal axis, a cam connected to and rotatable in response to movements of said manually operable member, said cam engaging said lever at a point spaced from said pivotal axis and said sighting reticule being also engaged by said lever at a point of contact spaced from said pivotal axis and from the point of contact between the cam and the lever, and means for laterally shifting the pivotal axis to vary the ratio of the length of the lever arm between the pivotal axis and the point of contact of the lever with the cam and the length of the lever arm between said pivotal axis and the point of contact of the lever with the sighting reticule by lateral adjustment of said pivotal axis.

3. In a range-finder of the type comprising an optical range-finding system which operates on the total image coincidence or split image principle, and which includes a member which is manually operable to adjust the optical system to determine the distance to the target, a sighting system including a sighting reticule mounted for vertical adjustment, a reticule adjusting lever mounted to swing about a laterally shiftable pivotal axis, a cam connected to and rotatable in response to movements of said manually operable member, said cam engaging said lever at a point spaced from said pivotal axis and said sighting reticule being also engaged by said lever at a point of contact spaced from said pivotal axis and from the point of contact between the cam and the lever, and means for varying the length of the lever arm between the pivotal axis of the lever and its point of contact with said cam by lateral adjustment of said pivotal axis.

References Cited in the file of this patent

UNITED STATES PATENTS

| | | |
|---|---|---|
| 1,178,475 | Becker | Apr. 4, 1916 |
| 2,023,838 | Kuppenbender et al. | Dec. 10, 1935 |
| 2,155,389 | Arden | Apr. 25, 1939 |
| 2,305,437 | Meyers et al. | Dec. 15, 1942 |
| 2,438,905 | Donicht et al. | Apr. 6, 1948 |

FOREIGN PATENTS

| | | |
|---|---|---|
| 579,188 | Germany | June 22, 1933 |